US012801848B2

(12) United States Patent
Gloor

(10) Patent No.: US 12,801,848 B2
(45) Date of Patent: Nov. 17, 2026

(54) SEMANTIC NETWORK ANALYSIS OF ONLINE MEDIA

(71) Applicant: Peter A. Gloor, Charlestown, MA (US)

(72) Inventor: Peter A. Gloor, Charlestown, MA (US)

( * ) Notice: Subject to any disclaimer, the term of this patent is extended or adjusted under 35 U.S.C. 154(b) by 75 days.

(21) Appl. No.: 18/827,945

(22) Filed: Sep. 9, 2024

(65) Prior Publication Data

US 2024/0428168 A1 Dec. 26, 2024

Related U.S. Application Data

(63) Continuation-in-part of application No. 17/844,747, filed on Jun. 21, 2022, now abandoned.

(51) Int. Cl.

| | |
|---|---|
| ***G06Q 10/06*** | (2023.01) |
| ***G06F 40/279*** | (2020.01) |
| ***G06Q 10/0637*** | (2023.01) |
| ***G06Q 10/067*** | (2023.01) |
| ***G06Q 10/42*** | (2026.01) |
| ***G06Q 10/46*** | (2026.01) |

(52) U.S. Cl.

CPC ..... *G06F 40/279* (2020.01); *G06Q 10/06375* (2013.01); *G06Q 10/067* (2013.01); *G06Q 10/42* (2026.01); *G06Q 10/46* (2026.01)

(58) Field of Classification Search

None

See application file for complete search history.

(56) References Cited

U.S. PATENT DOCUMENTS

| | | | |
|---|---|---|---|
| 10,044,862 | B1 | 8/2018 | Cai et al. |
| 10,275,235 | B2 | 4/2019 | Buehler et al. |
| 10,489,509 | B2 | 11/2019 | Alam et al. |
| 10,887,263 | B2 | 1/2021 | Bastide et al. |
| 10,956,684 | B2 | 3/2021 | Penrose et al. |
| 10,957,306 | B2 | 3/2021 | Chen et al. |
| 10,984,361 | B1 | 4/2021 | Shook et al. |
| 11,223,723 | B2 | 1/2022 | Dubey et al. |
| 11,270,076 | B2 | 3/2022 | McAteer et al. |

(Continued)

OTHER PUBLICATIONS

Morgan, L., Gloor, P.A. (2020). Identifying Virtual Tribes by Their Language in Enterprise Email Archives. In: Przegalinska, A., Grippa, F., Gloor, P. (eds) Digital Transformation of Collaboration. COINs 2019. Springer Proceedings in Complexity. Springer, Cham. (Year: 2020).*

(Continued)

*Primary Examiner* — Alan Torrico-Lopez

(74) *Attorney, Agent, or Firm* — Richard A Baker, Jr.

(57) ABSTRACT

This document discloses a system and method for predicting business performance by analyzing the ethical behaviors of individuals and teams within organizations. The system utilizes machine learning algorithms to analyze communication patterns and word usage in emails and social media posts, categorizing individuals into 'bee', 'ant', or 'leech' behavioral types. By correlating these behavioral types with various performance metrics, the system provides insights into the impact of ethical behaviors on organizational success. This automated approach overcomes the limitations of traditional survey-based methods, offering a more objective and scalable solution for assessing and managing ethical behaviors in diverse organizational contexts.

24 Claims, 4 Drawing Sheets

(56) References Cited

U.S. PATENT DOCUMENTS

| | | | | |
|---|---|---|---|---|
| 11,321,759 | B2 | 5/2022 | Adams et al. | |
| 11,587,172 | B1 * | 2/2023 | Guzman | G06Q 40/06 |
| 11,688,400 | B1 | 6/2023 | Johnson et al. | |
| 11,907,990 | B2 | 2/2024 | Byron et al. | |
| 2009/0319344 | A1 | 12/2009 | Tepper et al. | |
| 2012/0254333 | A1 * | 10/2012 | Chandramouli | G06F 40/10 709/206 |
| 2015/0347487 | A1 * | 12/2015 | Cohan | G06F 16/2291 726/4 |
| 2018/0189691 | A1 | 7/2018 | Oehrle | |
| 2018/0374107 | A1 | 12/2018 | Kannan et al. | |
| 2020/0097597 | A1 | 3/2020 | Lourentzou et al. | |
| 2020/0234208 | A1 | 7/2020 | Childress | |
| 2021/0081494 | A1 | 3/2021 | Bhattacharya et al. | |
| 2021/0233030 | A1 | 7/2021 | Preuss et al. | |
| 2022/0377174 | A1 | 11/2022 | Dwyer et al. | |
| 2023/0360067 | A1 * | 11/2023 | Dorrington | G06Q 30/0202 |
| 2023/0401222 | A1 | 12/2023 | Gutiarrez et al. | |
| 2024/0086641 | A1 * | 3/2024 | Coppersmith | G06F 40/216 |

OTHER PUBLICATIONS

Gloor, P., Fronzetti Colladon, A. & Grippa, F. Measuring ethical behavior with AI and natural language processing to assess business success. Sci Rep 12, 10228 (2022). (Year: 2022).*

Wen, Q., Gloor, P. A., Fronzetti Colladon, A., Tickoo, P., & Joshi, T. (2020). Finding top performers through email patterns analysis. Journal of Information Science, 46(4), 508-527. https://doi.org/10.1177/0165551519849519 (Year: 2020).*

Morgan, L. & Gloor, P. A, "Identifying virtual tribes by their language in enterprise email archives", Digital Transformation of Collaboration (eds Przegalinska, A. et al.) 95-110 (Springer, 2020).

Peter Gloor, et al, "Forecasting managerial turnover through e-mail based social network analysis", Computers in Human Behavior 71 (2017) 343-352.

Gloor, P. Zhao, Y. Analyzing Actors and Their Discussion Topics by Semantic Social Network Analysis, Proceedings of 10th IEEE International Conference on Information Visualisation IV06, London, Jul. 5-7, 2006.

Gloor, P. Krauss, J. Nann, S, Fischbach, K. Schoder, D. Web Science 2.0: Identifying Trends through Semantic Social Network Analysis. IEEE Conference on Social Computing (SocialCom-09), Aug. 29-31, Vancouver, 2009.

Fuehres, H. Fischbach, K. Gloor, P. Krauss, J. Nann, S. Adding Taxonomies Obtained by Content Clustering to Semantic Social Network Analysis. Bastiens, T. Baunmöl, U. Krämer, B. (eds) On Collective Intelligence, Springer Advances in Intelligent and Soft Computing, vol. 76, 2010.

McKean, M. Provost, S. Thakkar, S. Grippa, F. Gloor, P. Just the facts: Does moderate emotionality predict team performance? Proc. Sunbelt 2014, St. Pete Beach, Florida, Feb. 18-24.

Zhang, X. Gloor, P. Grippa, F. Measuring Creative Performance of Teams Through Dynamic Semantic Social Network Analysis. Int. J. Organisational Design and Engineering, vol. 4, No. 2, 2013.

Gloor,P. Fronzetti, A. Measuring Organizational Consciousness Through E-Mail Based Social Network Analysis, Proceedings of the 5th International Conference on Collaborative Innovation Networks COINs15, Tokyo, Japan Mar. 12-14, 2015.

Bronnimann, L. (2014), "Multilanguage sentiment analysis of Twitter data on the example of Swiss politicians", University of Applied Sciences Northwestern Switzerland, M.Sc. Thesis.

* cited by examiner

SEMANTIC NETWORK ANALYSIS OF ONLINE MEDIA

CROSS-REFERENCE TO RELATED APPLICATIONS

This application is a continuation-in-part of U.S. patent application Ser. No. 17/844,747, filed by Peter A. Gloor on Jun. 21, 2022, said application is incorporated herein in its entirety.

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Field of the Inventions

The present document relates to information processing devices and networks and more particularly information processing methods thereof.

Description of the Related Art

Past information processing methods have tried and failed to use information stored on information processing devices and networks to provide insights into organizational operations.

None of the previous works in this field, taken either singly or in combination, is seen to describe the instant inventions as claimed. Hence, the inventor of the present inventions proposes to resolve and surmount existent technical difficulties to eliminate the aforementioned shortcomings of prior art.

SUMMARY

In light of the disadvantages of the prior art, the following summary is provided to facilitate an understanding of some of the innovative features unique to the present inventions and is not intended to be a full description. A full appreciation of the various aspects of the inventions can be gained by taking the entire specification, claims, drawings, and abstract as a whole.

In some aspects, the techniques described herein relate to a computerized electronic device including: a processor; memory, communicatively connected to the processor; and a communications subsystem, communicatively connected to the processor and the memory; the memory including: a data retrieval module, the data retrieval module including non-transitory computer instructions for the processor to collect electronic communications data from emails and social media posts through the communications subsystem; a data analysis module, configured to access the emails and the social media posts, the data analysis module including non-transitory computer instructions for the processor to apply a natural language processing algorithm to extract linguistic features and communications patterns from the emails and the social media posts; an individual categorization module, configured to access the linguistic features and the communications patterns, the individual categorization module including non-transitory computer instructions for the processor to classify the emails and social media posts into behavioral types based on the linguistic features and the communications patterns; a correlation analysis module, configured to access the behavioral types, the correlation analysis module including non-transitory computer instructions for the processor to correlate the behavioral types and the social media posts with performance metrics of an organization to form a correlated analysis table; and an outcome prediction module, configured to access the correlated analysis table, the outcome prediction module including non-transitory computer instructions for the processor to generate a model of business performance based on the correlated analysis table, and present a prediction of the business performance based on the correlated analysis table.

In some aspects, the techniques described herein relate to a computerized electronic device wherein the memory further includes a social network analysis module, configured to access the behavioral types and the communications patterns, the social network analysis module including non-transitory computer instructions for the processor to compute centrality and response time metrics from the behavioral types and the communications patterns.

In some aspects, the techniques described herein relate to a computerized electronic device wherein the correlation analysis module is further configured to access the centrality and response time metrics and incorporates the centrality and response time metrics in the generation of the correlated analysis table.

In some aspects, the techniques described herein relate to a computerized electronic device wherein the memory further includes an emotional analysis module configured to access the linguistic features and the communications patterns to determine levels of specific emotions in the emails and the social media posts.

In some aspects, the techniques described herein relate to a computerized electronic device where the individual categorization module is configured to access the specific emotions and incorporate the specific emotions into the determination of the behavioral types.

In some aspects, the techniques described herein relate to a computerized electronic device where the specific emotions include the levels of anger, fear, happiness, and sadness.

In some aspects, the techniques described herein relate to a computerized electronic device where the categorization module employs a machine learning algorithm trained on a dataset of known behavioral examples.

In some aspects, the techniques described herein relate to a computerized electronic device where the communications subsystem includes a Facebook interface.

In some aspects, the techniques described herein relate to a computerized electronic device where the communications subsystem includes a LinkedIn interface.

In some aspects, the techniques described herein relate to a computerized electronic device where the behavioral types include "bee", "ant", and "leech".

In some aspects, the techniques described herein relate to a computerized electronic device where the behavioral type is assigned a first behavior type when the linguistic features and the communications patterns indicate ethical behavior, high interest in collaborative tasks, openness to new experiences, and a tendency to assist others.

In some aspects, the techniques described herein relate to a computerized electronic device where the behavioral type is assigned a second behavior type when the linguistic features and the communications patterns indicate unethical behavior, self-promoting and self-absorbed behavior, and a tendency to prioritize personal gain over group welfare.

In some aspects, the techniques described herein relate to a computer-implemented method including: retrieving data by a processor with a data retrieval module, the data retrieval module collecting electronic communications data from emails and social media posts through a communications subsystem communicatively connected to the processor; applying a natural language processing algorithm on the processor to extract linguistic features and communications patterns from the email and the social media posts with a data analysis module; classifying, with the processor, the emails and the social media posts into behavioral types based on the linguistic features and the communications patterns with an individual categorization module; correlating, with the processor, the behavioral types and the social media posts with performance metrics of an organization to form a correlated analysis table using a correlation analysis module; and generating a model of business performance based on the correlated analysis table, and presenting a prediction of the business performance based on the correlated analysis table with an outcome prediction module.

In some aspects, the techniques described herein relate to a computer-implemented method, further including computing centrality and response time metrics from the behavioral types and the communications patterns by a social network analysis module.

In some aspects, the techniques described herein relate to a computer-implemented method, where the correlation analysis module incorporates the centrality and response time metrics in the generating of the correlated analysis table.

In some aspects, the techniques described herein relate to a computer-implemented method, further including accessing the linguistic features and the communications patterns to determine levels of specific emotions in the email and the social media posts by an emotional analysis module.

In some aspects, the techniques described herein relate to a computer-implemented method, where the individual categorization module incorporates the specific emotions into the determining of the behavioral types.

In some aspects, the techniques described herein relate to a computer-implemented method, where the specific emotions include the levels of anger, fear, happiness, and sadness.

In some aspects, the techniques described herein relate to a computer-implemented method, wherein the individual categorization module employs a machine learning algorithm trained on a dataset of known behavioral examples.

In some aspects, the techniques described herein relate to a computer-implemented method, where the behavioral type is assigned one behavior type when the linguistic features and the communications patterns substantially indicate firm moral values within a group, competitive and hard work, and valuing tradition and loyalty.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed inventions and explain various principles and advantages of those embodiments.

Figure 1:
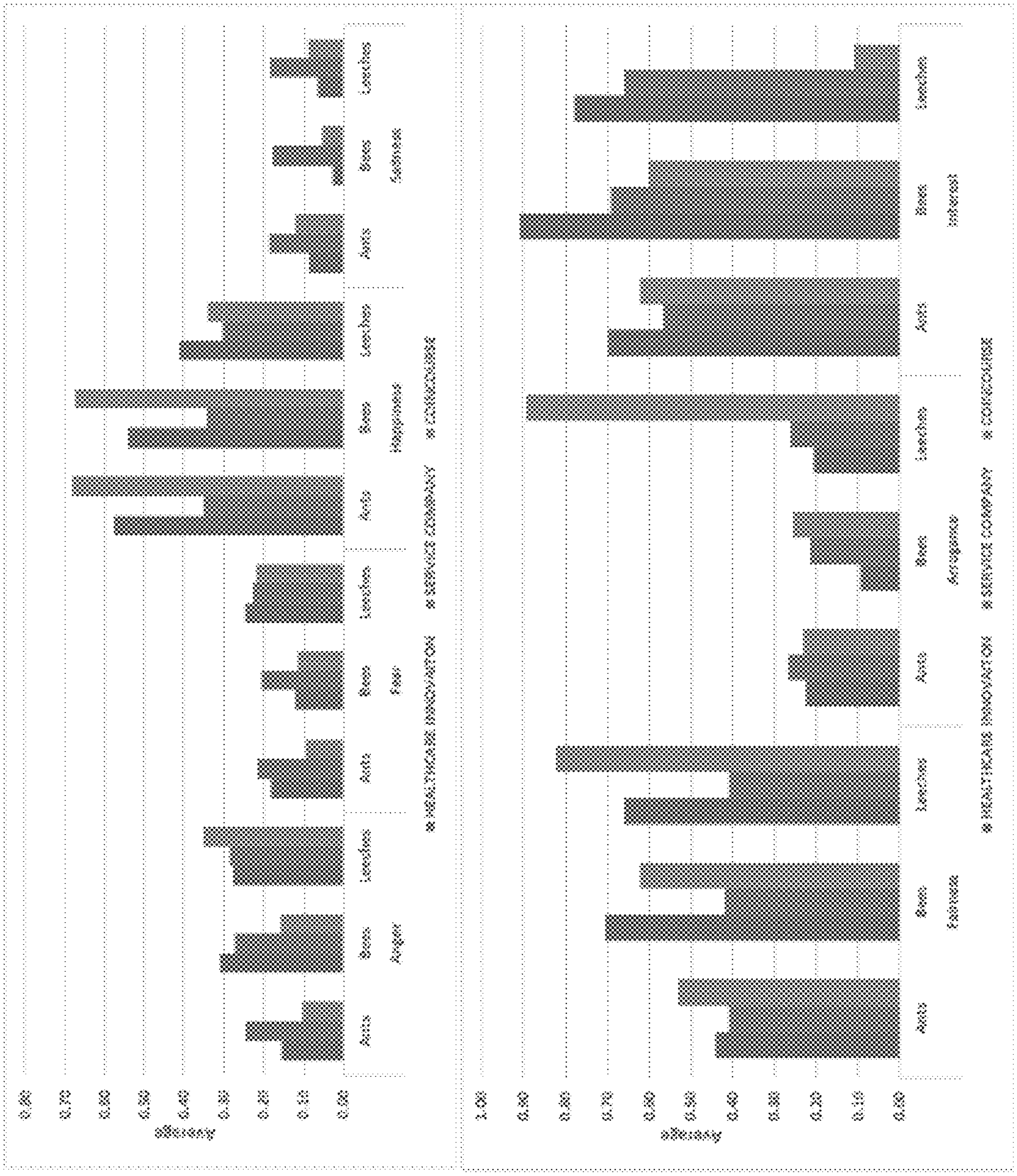
FIG. 1 shows the correlation between being a bee/ant/leech and having a certain emotion (anger etc.) or personality characteristic with two charts.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present inventions.

The apparatus and method components have been represented where appropriate by conventional symbols in the drawings, showing only those specific details that are pertinent to understanding the embodiments of the present inventions so as not to obscure the disclosure with details that will be readily apparent to those of ordinary skill in the art having the benefit of the description herein.

DETAILED DESCRIPTION

Detailed descriptions of several embodiments are provided herein. It is to be understood, however, that the present inventions may be embodied in various forms. Therefore, specific details disclosed herein are not to be interpreted as limiting, but rather as a basis for the claims and as a representative basis for teaching one skilled in the art to employ the present inventions in virtually any appropriately detailed system, structure, or manner.

German army sergeant Anton Schmid was executed as a traitor by the German army for saving 300 Jews by shielding them from the Ponary massacre. While Schmid was recognized by Israel right after the Second World War, Schmid's widow was refused a pension after the war, and her windows were smashed by the neighbors as the wife of a traitor. Schmid was a true "bee", while the army and the neighbors acted as "ants". Human "bees", just like the real bees pollinating the plants on our planet, are doing good for everybody. However, just like real bees, human "bees" frequently get little recognition for their essential contributions to the good of society. Worldly recognition goes to human "ants" and "leeches". Just like real ants sacrifice their lives for their hive while fighting to the death with ants from competing hives, human "ants" are competitive workers who are well-embedded in their in-group and work hard to get ahead. It took the human ants in the German army over fifty years to change the moral code of their in-group and give Sergeant Schmid recognition for his ethical behavior by renaming a military base after him. While human ants value loyalty within their in-group, human "leeches" are egoists. Just like real leeches, which steal their victim's blood for themselves, human "leeches" only care about their benefits with little regard for the welfare of others.

As used in this document, the terms "bee", "ant", and "leech" are example terms that could be substituted by any other word(s) without deviating from the inventions herein.

"Bees" are ethical, "ants" might have firm morals, while "leeches" are unethical. While colloquially the terms ethics and morality are frequently used interchangeably, many philosophers, going back to Aristotle and Spinoza see ethics as the standard for discerning "good vs. bad" or "right vs. wrong" based on societal values, while they associate morality with the personal attitude of individuals towards others. This means that ethical people are universally good, in the sense of "universalists" as defined in the Theory of Basic Human Values by Schwartz et al. Moral people care for the welfare of members of their in-group while having limited tolerance for behavior that deviates from their norms. For instance, even people who support gay marriage think that gay sex is immoral. Morals thus define a personal value system. People who share similar morals aggregate in virtual tribes, such as pro or contra abortion, or pro or contra vaccines. While social pressure gets human "bees", "ants", and "leeches" to claim to act by high ethical standards, their underlying value systems exhibit radical differences. Just pretending to be ethical does not make one ethical. Enron had the most beautifully written code of ethics, while its entire upper-level management definitively behaved highly unethically, following their own "moral code" of personal greed. Applying the Schwartz system of personal values, a "bee" would be an ethical adherent of universalism and benevolence, understanding and protecting all people's welfare and nature. "Ants" and "leeches," on the other hand, are strongly motivated by self-enhancement, striving for achievement and power. The key difference between the two is that "ants" highly value tradition and loyalty to other members of their in-group, while "leeches" only care about their own interests, with no concern for the welfare of others. In other words, bees are "ethical", ants are "moral", and leeches are "amoral". Differently from "bees", "ants," and "leeches" will thus stick to the moral value systems of their in-groups which might be ethical or unethical, with little compassion for the rest of society.

Research is contradictory, with some researchers finding that ethical leaders will create higher-performing organizations, while others find that unethical individuals will be promoted faster. Although religion and the law want individuals and companies to restrict competitive behavior and act ethically and according to social and community expectations, the reality is quite different. In business, law, and medicine, the concept of ethics serves as a personal code of conduct for people working in those fields, and ethical decisions themselves are often contested and challenged. Frequently, "who breaks the law without being caught" wins. For instance, personality characteristics of psychopaths and CEOs show worrying similarities. Frequently the most egotistical person is chosen as the leader of an organization. On the other hand, ethical leaders are highly appreciated by their subordinates. While authoritative and inflexible leadership might have worked in an earlier era, today's workers demand inclusiveness, empowerment, and a collaborative approach to problem-solving. Employees do not respond positively to top-down leadership, commonly considered outdated and counterproductive. Rather, they expect managers to follow humble, servant, and ethical leadership styles that are conducive to a work environment that enhances trust and builds positive relationships.

Leaders in ethical organizations adopt collaborative approaches to promote engagement and fair behaviors without using authoritative power. In traditional bureaucratic organizational models, leaders issue commands and expect compliance from subordinates, often through authoritative power. In organizations dominated by a command-and-control style, employees are not empowered to change a course of action even when they witness unethical or unlawful behaviors. Empirical evidence has shown how ethical leadership models enable followers to make decisions moving away from domineering or self-centered approaches. Ethical and humble leadership has been associated with the perceived effectiveness of leaders, employees' job satisfaction and dedication, and their willingness to report problems to management. Ethical leaders encourage normative behavior and discourage unethical behavior of their subordinates by being an ethical example, treating people fairly, and actively managing morality.

Previous research has traditionally explored the association between ethical behaviors and outcomes by adopting qualitative methods, including surveys and self-report questionnaires. Our study contributes to this literature on ethical decision-making by providing a complementary methodology based on the digital traces that individuals leave as they interact online. In this study, we leverage the latest advances in natural language processing (NLP) and build "bee", "ant," and "leech" "tribes" of ethical, moral, and amoral people. Tribes are groups composed of members connected through a common belief or ideology. The concept has been used primarily in the marketing literature to describe consumer behavior. Individuals in the same tribe share similar behaviors and similar ethical values and emotional responses to external stimuli. In the rest of this paper, we will use the term "ethical values" as the goal to aspire to, distinguishing between ethical bees, moral ants, and amoral leeches. The system involves well-placed procedures and technology for dynamically and automatically utilizing multiple mobile and web platforms to collect communication records. The system integrates all communication records from different sources (primarily email, microblogging (e.g. Twitter), and online chat (e.g. Teams, Slack) and applies machine learning on all collected data to identify bees, ants, and leeches.

We human beings are social creatures. As we use our computational tools to communicate with one another, the social interactions that we engage in leave impressions in network traffic and log files. The map of communication that binds a community can be extracted from a variety of sources, such as network traffic traces, file shares, and IMlogs. The typical daily usage seen by corporate and educational department e-mail servers, for example, generates predictable patterns in the social network that can be quantized using graph theory. Similarly, misuse patterns, such as the generation of traffic from accounts being controlled by unauthorized users, appear as anomalies in the social network which can also be easily quantified.

Social Network Analysis (SNA) provides powerful methods to study the relationships between people expressed as binary or weighted adjacency matrices. It can be used to find influential or popular nodes, communities, and informal hierarchies. However, it is limited in the sense that it cannot capture the context of their encounter.

The current document proposes a novel approach towards exploring the solution of one main important phenomenon which is how ethical values are correlated with individual and company performance. The relationship between ethical values and behavior has attracted the interest of social scientists for several decades. Therefore, a new approach for the measurement of ethical behavior with AI and Natural Language Processing to assess business success is proposed.

One object of this document is to provide a novel and improved approach for the measurement of ethical behavior with AI and natural language processing to assess business success.

One objective of the document is to provide a computer-based system that is based on three different "tribes" of ethical, moral, and non-ethical people, based on Twitter (also known as X) feeds of people of known high and low ethics and morals: fair and modest collaborators codified as ethical "bees"; hard-working competitive workers as moral "ants"; and selfish, arrogant people as non-ethical "leeches". Results from three studies involving a total of 49 work-groups and individuals within three different industries (healthcare, business consulting, and higher education) confirm the validity of our model. Associating membership in ethical or unethical tribes with performance, we find that being ethical correlates positively or negatively with success depending on the context.

Thus, it is one objective to provide a system for predicting business performance through social network-based analysis. Other aspects, advantages, and novel features of this document will become apparent from the detailed description of the inventions when considered in conjunction with the accompanying drawings Still yet another object of this document is to provide a new and improved automation method and system for calculating the morality of individuals based on word usage of individuals.

In accordance with this document, automation methods and systems for predicting the business success of organizations by automatically calculating the morality of individuals in the organization from their word usage are presented.

As per one embodiment of the inventions, the inventive system studies the relationship between ethical values and behavior. The values are defined as desirable goals that act as guiding principles in people's lives. They are then translated and become visible through individual behaviors and concrete actions. Values may be important to some people and unimportant to others. Ethical identity has been positively related to prosocial behaviors such as charitable giving and negatively related to unethical behaviors such as lying. Ethical identity acts as a "self-regulatory mechanism" embedded in people's internalized notions of right and wrong, influencing individual ethical behavior. To help resolve important behavioral and ethical issues-including discrimination or sexual harassment-scholars have stressed the role of universal ethical values in defining corporate codes of ethics.

The importance of ethical values in organizations is clearly explained by studies that document significant and positive relationships between firms' social responsibility and financial performance. Ethical decision-making and ethical leadership have been associated with increased business performance measured at the individual level. For instance, a case study of supervisor-subordinate dyadic data from Taiwanese organizations showed that subordinates' business ethical values are positively associated with job performance and employee engagement.

According to the social learning theory, individuals learn appropriate behaviors through a role-modeling process by observing the behaviors of others around them. Studies show that team members exposed to similar cues regarding norms and ethical behaviors tend to behave homogeneously. Group norms are formed and reinforced by leaders' behaviors, as they communicate as role models the importance of ethical values and use punishment and reward systems to encourage behaviors that align with cultural and universal values. Empirical studies across various countries show that the ethical behavior of peers has the most significant impact on both individual moral values and group ethical behavior. Ethical leaders will influence their subordinates to adjust their morals to be more ethical. A 2020 study on ethical leadership in business confirms that ethical values, especially when modeled by leaders, enhance both individual and business performance.

A few studies have focused on measuring ethical values and ethical behaviors through the lenses of the big five factors of personality, suggesting that conscientiousness, agreeableness, and emotional stability are most consistently related to ethical leadership and agreeableness with power-sharing and fairness. Recent empirical studies of European and African managers found that fairness of performance evaluation is associated with job satisfaction and mediated by trust and organizational commitment. Other research has shown that satisfied employees increase business success. In combination, this demonstrates that adhering to ethical values such as fairness will increase business performance. For example, research by Bowen et al. indicates that just and fair behaviors in the workplace translate into increased customer satisfaction. Other studies exploring the impact of organizational justice in HRM practice provide evidence that behaviors that "honor the justice principles" positively impact both job satisfaction and overall job performance.

Research Design

Traditional approaches to measuring ethical values and ethical decision-making rely on data collected through surveys, questionnaires, or focus groups. For instance, a study involving middle-level managers and engineers at an aviation center relied on questionnaires to demonstrate the impact of ethical behavior on turnover intention. Knafo and Sagiv conducted 603 phone interviews with Israeli families to explore the relationship between values and occupational environments. Schwartz and his colleagues developed the Portrait Values Questionnaire (PVQ) based on Schwartz's theory of values, which identified ten fundamental individual values influencing human actions. However, the survey-based approach has considerable disadvantages, as individuals are notoriously bad at self-assessment, either seeing themselves in too positive a light or being overly critical of themselves. Researchers have repeatedly found that an individual's friends are much better at rating the individual's personality traits than the individual. AI and machine learning put new tools at the disposal of behavioral and organizational researchers, allowing them to automatically analyze electronic traces of individuals to predict their personality characteristics. AI thus leverages the "wisdom of the swarm" to extend the judgment of friends by aggregating the assessment of large groups of people of the personality traits of an individual.

To overcome these limitations traditionally associated with survey methods, the present techniques scan digital documents-including emails and social media posts-through a deep learning algorithm and consider the use of similar words in similar contexts. The tribal affiliations of individuals are identified based on the words used by "tribal leaders". Models of different tribes are built using long short-term memory (LSTM) and the Tensorflow machine learning framework to train their models with the Twitter streams of tribal leaders. The machine learning system assigns tribal membership based on the word usage of individual tribe members on social media. The system proved to reach high classification accuracy values and Cohen's Kappa. It computes a dictionary of tribal words and their distribution in the text using a probabilistic distribution of a dictionary of millions of words called "word embeddings". Once a tribe is created, the tribe members are plotted in proximity to each other, based on word usage and how they fit in with the predefined tribes.

Researchers have been using machine learning to identify ethical tribe categories based on the content shared on Twitter or via email. For instance, Morgan and Gloor (Morgan, L. & Gloor, P. A., "Identifying virtual tribes by their language in enterprise email archives", *Digital Transformation of Collaboration* (eds Przegalinska, A. et al.) 95-110 (Springer, 2020)) analyzed the communication habits of three morality tribes, i.e., nerds, treehuggers, and fatherlanders, and found that these tribes significantly differ in how they communicate by email. Recent research has used digital traces such as emails and social media posts to predict emotional and behavioral traits from email communication. Gloor and Fronzetti Colladon (Peter Gloor, et al, "Forecasting managerial turnover through e-mail based social network analysis", Computers in Human Behavior 71 (2017) 343e352) found that communication patterns measured through e-mail interaction correspond with the ethical values of a person.

Motivated by the discussion on the impact of ethics on performance in the previous section, we explore ethical and unethical behavior via the words used by team members, categorizing individuals into three tribes, ethical "bees", moral "ants," and amoral "leeches".

The Ethical Tribes Framework

To identify automatically tribal affiliation of "bees", "ants", and "leeches", three tribes were created, with the bee tribe leaders being open-source developers and artists, the ant tribe members being competitive athletes, and the leech tribe leaders being hedge fund managers and peddlers of "getting rich quick" schemes. In general, we relied on the procedure suggested by Gloor, where AI-based methods are introduced to identify the personality, moral values, and ethics of individuals based on their body language and interaction with others. Additionally, six other "personality attribute tribes" were created to cross-verify the bees, ants, and leeches. We have chosen the representatives of these personality attribute tribes based on their perception in newspapers such as USA Today and People magazine and on Websites such as Quora. Indeed, it has been shown that the language that individuals use in blogs and online forums can be a strong signal of their personality. For instance, for the "arrogance" tribe, members were chosen from celebrities with a reputation for arrogance, such as Charlie Sheen or Will Smith. For the "modesty" tribe we chose celebrities with a reputation for modesty, such as the Dalai Lama and Emma Watson. For the "fairness" tribe we considered social advocates and human rights activists. Lastly, the "unfairness" tribe was built based on people like the editor of "Breitbart News" and hedge fund managers. The last two tribes are the "interest" tribe—subsuming curiosity, a passion for learning, and exploration of unknowns, with members such as Steven Pinker and Bill Gates—and a "disinterest" tribe of "couch potatoes", which are individuals who are primarily interested in their hedonistic pleasures with members expressing their boredom on their Twitter profiles. It was quite hard to identify exemplary members for each tribe as, for instance, Lady Gaga has a reputation for being a comparatively modest down-to-earth artist, but artists in general by nature are gregarious extroverts and anything but modest. We, therefore, carefully cross-checked each member of these tribes by looking at their tweets and making sure that the tweets of members of the modesty tribe showed a very low arrogance score, which helped eliminate celebrities like Lady Gaga from the tribe.

The "bee" behavioral type is seen in individuals who substantially have ethical behavior, high interest in collaborative tasks, openness to new experiences, and a tendency to assist others. The "ant" behavioral type is seen in individuals with substantially firm moral values within the group, competitive and hard work, and value tradition and loyalty. The "leech" behavioral type is seen in individuals substantially exhibiting unethical behavior, self-promoting and self-absorbed behavior, and a tendency to prioritize personal gain over group welfare. Note that all individuals have some behavior from all behavior types, and the classification is done by determining the dominant behavior.

Data and Performance Metrics

To verify the validity of our approach, we carry out an email network and content analysis, considering three different e-mail archives. For each archive, we build a social network based on the email interaction of individuals and teams, and we analyze the content of email bodies or subject lines. In this network, each email account is represented as a node, with emails translating into one or more links connecting different nodes.

The first dataset, called "COINcourse", consists of three cohorts of students enrolled in an international seminar on Collaborative Innovation Networks over three semesters, with a total of 89 students working in 21 groups. The performance metric is the final grade for each group, given by a group of three instructors. The email archive consists of 89 students sending a total of 871 emails. The contents of emails sent by the 89 students were used to calculate their behavioral and emotional scores.

The second dataset, called "Healthcare Innovation", consists of emails exchanged by 101 group members working in 11 innovation groups in the healthcare environment. The performance, innovation, and learning behaviors of each group were rated every other month for a year by three supervisors, who individually rated group performance, the capability of a group to learn new things, and the innovativeness of problem-solving methods.

The total email dataset includes 1782 actors (the outgroup) sending 286,029 emails, which was used for calculating the network metrics, while the content of the 191,519 emails sent by the 101 group members (the in-group) was used for calculating their behavioral and emotional scores.

The third dataset, called "Service Company", consists of 91 managers who are part of 17 groups serving 17 large international customers of a global services firm. The managers are rated individually by their supervisors using three categories: outstanding, excellent, and good. The group performance is rated using the Net Promoter Score (NPS) collected from each group's customers. NPS is a measure of customers' loyalty to a company and is calculated using the answer to a key question "On a scale from 0 to 10, how likely is it that you would recommend a company (or brand) to a friend or colleague?". The total email dataset includes 1752 actors who sent 769, 125 emails (the outgroup). This was used for calculating the network values, while the subject lines of the 126,978 emails sent by the 91 managers (the in-group) were used to calculate their behavioral and emotional scores. Note that, for this dataset, we were only able to obtain the subject line of emails, instead of the content of the entire email exchange, because of privacy restrictions. However, it has been shown in earlier work that for e-mail content analysis, metrics derived from the subject line are correlated with metrics derived from contents.

Research has shown an intrinsic connection between ethical behavior and emotional response to an event. To support our method, we relied on the Basic Emotion theory, which proposes that human beings have a limited number of "biologically basic" emotions, including fear, anger, joy, and sadness.

A different classification has been offered by the Dimensional Theory of emotion, which uses three dimensions: pleasant-unpleasant, tension-relaxation, and excitation-calm, or various adaptations of the Circumplex model, where each emotion is located on a quadrant that reflects varying amounts of hedonic and arousal properties. Other researchers investigated the role of specific emotions, including shame and empathy, as they play a fundamental role in morality, with guilt being often considered the quintessential "moral emotion".

To improve the accuracy of the algorithm, we chose the framework of the Basic Emotion Theory, as it proposes a basic classification of four fundamental emotions, namely fear, anger, joy, and sadness. These emotions have been preserved because of their biological and social functions are associated with an organized recurring pattern of behavioral components. The Basic Emotion Theory was adopted by a recent study that used facial emotion recognition to predict emotional responses to visual stimuli, which highlights the strong association between personality characteristics and moral values of individuals. Based on an individual's moral values, the individual will show different emotional responses. Therefore, besides the personality tribes, we also compute the emotionality of the emails using four categories: anger, fear, happiness, and sadness. The algorithm was trained to recognize these emotions, following a procedure similar to that used to classify personality attributes, i.e., training an AI model. We focus on these basic emotions as they have been considered by many to be the prototypical ones. A combination of these emotions leads to more complex ones, as shown by Ekman's Basic Emotions Theory. The Basic Emotion Theory represents an appropriate framework to train the AI algorithm, as it offers a classification of a limited number of emotions (e.g., fear, anger, joy, sadness) that are biologically and psychologically "basic" to all human beings.

In addition to analyzing the language used in email communication, we calculated key social network metrics, including degree centrality, betweenness centrality, and average response time to identify individual prominence (degree centrality) and information brokerage (betweenness centrality). The average response time (ART) indicates how fast an individual or a group responds to e-mails, offering insights into the degree of respect that an individual commands and the level of commitment they show. We also distinguished between "alter ART" and "ego ART", respectively indicating the time taken by recipients to answer an actor's emails and the time taken by that actor to answer the emails s/he receives. These metrics are part of the six honest signals of collaboration described by Gloor.

Results

Our analysis follows two steps. First, we examine the behavior of people classified as bees, ants, and leeches and then relate these roles to performance with metrics at both the individual and group levels.

Behavioral Trends for Bees, Ants, and Leeches

FIG. 1 shows the average values for both emotional (i.e., anger, fear, happiness, and sadness) and behavioral scores (i.e., arrogance, fairness, interest) of ants, leeches, and bees—while considering the three datasets described in the previous section.

To evaluate the significance of mean differences, we carried out an analysis of variance, as presented in Tables 1-3. Instead of using a classic analysis of variance (ANOVA), we used Welch's ANOVA as a robust alternative in the case of unequal group variances—as indicated by the results of the Levene's tests that we performed for all groups. Accordingly, we also ran a robust post-hoc analysis to evaluate significant group differences through Games-Howell tests.

As shown in FIG. 1 and Tables 1-3, bees and ants are less arrogant than leeches. Bees are also more interested and less fearful than leeches. Surprisingly, ants seem to be the happiest group. Our post-hoc analysis reveals that the most significant differences are usually between ants and leeches and between bees and leeches. This is partially dependent on the datasets used in the study. For example, significant differences between ants and bees emerge in the Healthcare Innovation dataset.

TABLE 1

Welch's ANOVA - COINcourse dataset

| Variable | Welch's ANOVA Significance | Games-Howell Post-Hoc Tests | | | |
|---|---|---|---|---|---|
| Anger | .000 | | Ants | Leeches | Bees |
| | | Ants | | *** | |
| | | Leeches | *** | | *** |
| | | Bees | | *** | |
| Fear | .000 | | Ants | Leeches | Bees |
| | | Ants | | ** | |
| | | Leeches | ** | | *** |
| | | Bees | | *** | |
| Happiness | .000 | | Ants | Leeches | Bees |
| | | Ants | | ** | |
| | | Leeches | ** | | *** |
| | | Bees | | *** | |
| Sadness | .056 | | Ants | Leeches | Bees |
| | | Ants | | | |
| | | Leeches | | | ^ |
| | | Bees | | ^ | |
| Fairness | .001 | | Ants | Leeches | Bees |
| | | Ants | | ^ | |
| | | Leeches | ^ | | *** |
| | | Bees | | *** | |
| Arrogance | .000 | | Ants | Leeches | Bees |
| | | Ants | | *** | |
| | | Leeches | *** | | *** |
| | | Bees | | *** | |
| Interest | .000 | | Ants | Leeches | Bees |
| | | Ants | | *** | |
| | | Leeches | *** | | *** |
| | | Bees | | *** | |

^ $p < .1$;
* $p < .05$;
** $p < .01$;
*** $p < .001$.

TABLE 2

Welch's ANOVA - Service Company dataset

| Variable | Welch's ANOVA Significance | Games-Howell Post-Hoc Tests | | | |
|---|---|---|---|---|---|
| Anger | .007 | | Ants | Leeches | Bees |
| | | Ants | | ** | |
| | | Leeches | ** | | |
| | | Bees | | | |
| Fear | .050 | | Ants | Leeches | Bees |
| | | Ants | | | |
| | | Leeches | | | ^ |
| | | Bees | | ^ | |
| Happiness | .000 | | Ants | Leeches | Bees |
| | | Ants | | ** | |
| | | Leeches | ** | | * |
| | | Bees | | * | |

TABLE 2-continued

| Welch's ANOVA - Service Company dataset | | | | | |
|---|---|---|---|---|---|
| Variable | Welch's ANOVA Significance | Games-Howell Post-Hoc Tests | | | |
| Sadness | .794 | | Ants | Leeches | Bees |
| | | Ants | | | |
| | | Leeches | | | |
| | | Bees | | | |
| Fairness | .872 | | Ants | Leeches | Bees |
| | | Ants | | | |
| | | Leeches | | | |
| | | Bees | | | |
| Arrogance | .000 | | Ants | Leeches | Bees |
| | | Ants | | | * |
| | | Leeches | | | *** |
| | | Bees | * | *** | |
| Interest | .000 | | Ants | Leeches | Bees |
| | | Ants | | *** | *** |
| | | Leeches | *** | | ^ |
| | | Bees | *** | ^ | |

^ p < .1;
* p < .05;
** p < .01;
*** p < .001.

TABLE 3

| Welch's ANOVA - Healthcare Innovation dataset | | | | | |
|---|---|---|---|---|---|
| Variable | Welch's ANOVA Significance | Games-Howell Post-Hoc Tests | | | |
| Anger | .000 | | Ants | Leeches | Bees |
| | | Ants | | ** | *** |
| | | Leeches | ** | | |
| | | Bees | *** | | |
| Fear | .000 | | Ants | Leeches | Bees |
| | | Ants | | | |
| | | Leeches | | | *** |
| | | Bees | | *** | |
| Happiness | .000 | | Ants | Leeches | Bees |
| | | Ants | | ** | |
| | | Leeches | ** | | *** |
| | | Bees | | *** | |
| Sadness | .000 | | Ants | Leeches | Bees |
| | | Ants | | | * |
| | | Leeches | | | ** |
| | | Bees | * | ** | |
| Fairness | .000 | | Ants | Leeches | Bees |
| | | Ants | | *** | *** |
| | | Leeches | *** | | |
| | | Bees | *** | | |
| Arrogance | .000 | | Ants | Leeches | Bees |
| | | Ants | | | ** |
| | | Leeches | | | ** |
| | | Bees | ** | *** | |
| Interest | .000 | | Ants | Leeches | Bees |
| | | Ants | | | *** |
| | | Leeches | | | *** |
| | | Bees | *** | *** | |

^ p < .1;
* p < .05;
** p < .01;
*** p < .001.

The analysis of social network metrics indicates the presence of different behavioral patterns, again depending on the dataset. For example, we find that bees are much more central in the email network while considering the COIN-course and Healthcare Innovation dataset—both in terms of degree and betweenness centrality. On the other hand, leeches are more active—they send more messages and have a higher degree—in the Service Company dataset.

Performance of Bees, Ants, and Leeches

As the second step of the analysis, we looked for a relationship between performance and the individual classification of participants as ant, leech, or bee. The regression analysis produced the models presented in Tables 5-7, which show the best models for each dataset. All our models were tested to exclude multicollinearity problems. The Variance Inflation Factor (VIF) values were reasonably low-always lower than 2.5 and, in most cases, also lower than 2.

In Table 4, we present the effect of the three categories (ants, bees, and leeches) on group and individual performance, only relating to the Service Company dataset.

TABLE 4

| Regression Analysis - Service Company dataset | | |
|---|---|---|
| Variable | Individual Performance | Group Performance |
| Ant Dummy | .825** | |
| Arrogance | −.898* | |
| Average Interest | | −3.685* |
| Average Degree | | −.003* |
| Number of Leeches | | −.096^ |
| Average Arrogance | | −3.570^ |
| Average Ego ART | | −.071** |
| Constant | 1.438*** | 6.274** |
| Adjusted $R^2$ | .139 | .437 |
| N | 87 | 17 |

^p < .1;
*p < .05;
**p < .01;
***p < .001.

As already mentioned, individual performance was judged by the supervisors of the managers participating in the study, while group performance was evaluated by the company's clients and measured as customer satisfaction through the NPS indicator.

Results from the regression analysis (Table 4) indicate that individual ratings are higher when managers are less arrogant and in the ant category. On the other hand, more variables contribute to group performance, i.e., client satisfaction. Groups that received higher evaluations answered emails faster, had a lower number of leeches, and comprised less arrogant employees. Employees in these groups were also characterized by a lower degree of centrality and lower interest. In other words, these employees were more focused on a smaller number of key customers, to whom they gave preferential treatment by answering them more quickly and talking less about topics of general interest.

In Table 5, we present the analysis carried out on the Healthcare Innovation dataset, where 11 groups were evaluated with respect to performance, innovation, and learning skills.

TABLE 5

| Regression Analysis - Healthcare Innovation dataset | | | |
|---|---|---|---|
| Variable | Group Performance | Group Innovation | Group Learning |
| Number of Bees | .738* | | .683* |
| Number of Leeches | | −86.181* | −10.581* |
| Average Degree | | −.125* | |
| Average Happiness | | 754.071** | |
| Average Fear | | 1423.264^ | |
| Average Fairness | | | −35.550* |
| Average Arrogance | | | 61.533* |
| Constant | 17.051*** | −257.007 | 28.341* |

TABLE 5-continued

| Regression Analysis - Healthcare Innovation dataset | | | |
|---|---|---|---|
| Variable | Group Performance | Group Innovation | Group Learning |
| Adjusted $R^2$ | .444 | .623 | .715 |
| N | 11 | 11 | 11 |

^p < .1;
*p < .05;
**p < .01;
***p < .001.

As Table 5 shows, the presence of bees is particularly relevant for a good group performance. For innovation tasks, on the other hand, it seems more important to have focused communication (having a lower degree) and as few leeches as possible. Groups that present high innovation skills are more emotional, exhibiting higher levels of happiness and fear. Lastly, the presence of bees (and a low number of leeches) seems to favor group learning. Surprisingly, learning abilities are also higher when group members are less fair and more arrogant.

Table 6 shows the best regression models for the COIN-course dataset, where a group of teachers evaluated 21 groups of students. Grades had continuous values, ranging from 1 to 2—with 2 representing the highest grade and 1 the lowest.

TABLE 6

| Regression Analysis - COINcourse dataset | |
|---|---|
| Variable | Group Final Grade |
| Number of Bees | .151* |
| Number of Leeches | −.167* |
| Average Arrogance | .898** |
| Average Betweenness | .005* |
| Constant | 1.040*** |
| Adjusted $R^2$ | .450 |
| N | 21 |

^p < .1;
*p < .05;
**p < .01;
***p < .001

In the COINcourse dataset, student groups that achieved a higher grade had more bees and fewer leeches (see Table 6)—which is aligned with the results obtained for Group Learning in the Healthcare Innovation dataset. In addition, it seems that having higher betweenness centrality (probably increasing the possibility of integrating knowledge coming from multiple sources) is beneficial to performance. Surprisingly, groups with higher average levels of arrogance achieved a higher grade. This might have to do with the students' self-esteem, in that groups that were more self-assured in their presentations got a higher grade from their instructors.

Figure 2:
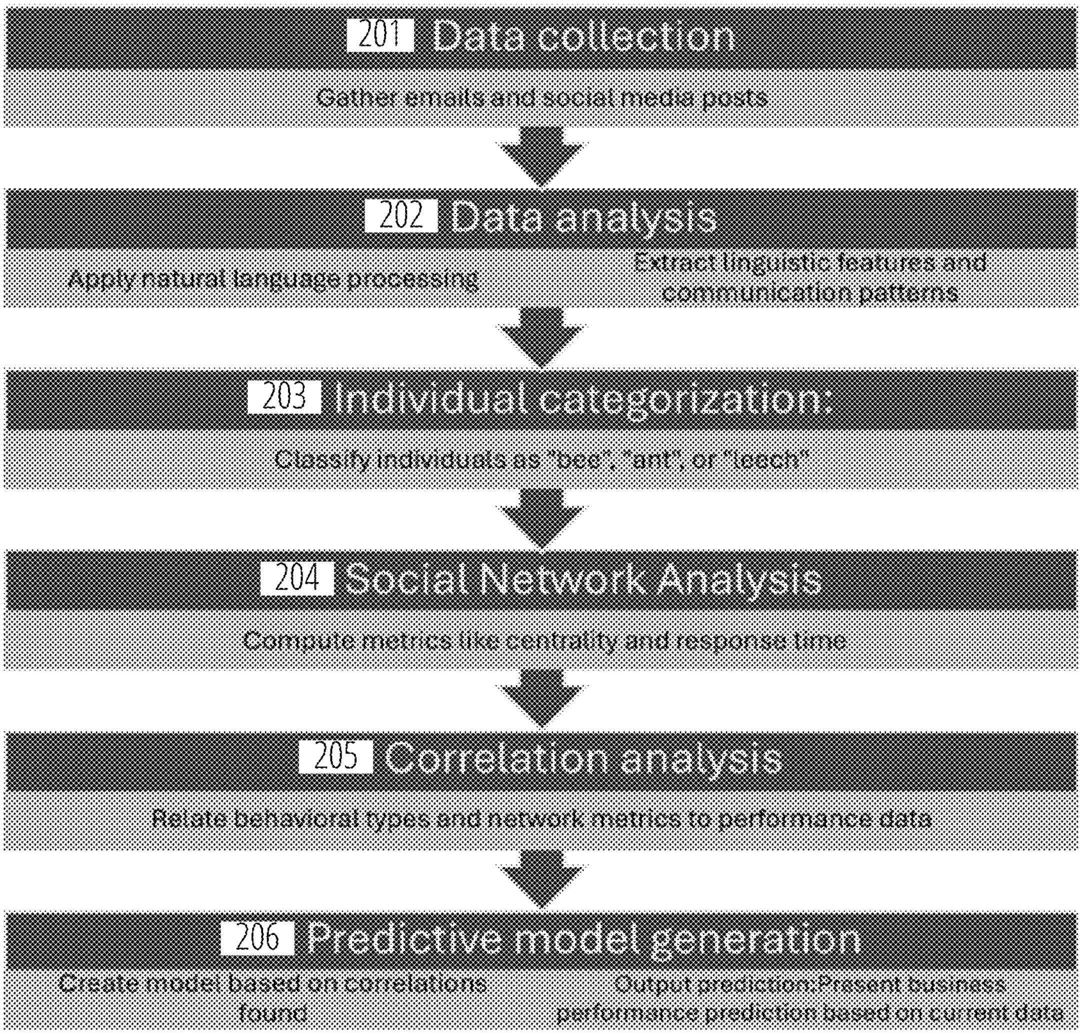
FIG. 2 shows a process flow chart of the inventions.

FIG. 2 shows a possible flow chart of the calculation of the moral values to predict business performance. This process starts with data collection 201, gathering emails, chat logs, and social media posts. The gathering may be a process where the processor 1110 uses the communications 1420 subsystem to connect to the cloud 1436 through the email interface 1428, Facebook interface 1430, LinkedIn interface 1432, Twitter interface 1434, Internet/Web Interface 1426, or similar. In some embodiments, the processor 1110 connects to the remote email server and downloads the entire set of emails for specific users within certain dates. The downloaded set is then stored in the memory 1112, perhaps in the system database 1412, disk drives 1410, and/or RAM 1408. The same process may be done for Facebook, Twitter, LinkedIn, and other social media tools.

Next, the data analysis module 202 applies natural language processing to extract linguistic features and communication patterns. First, the test of the email or social media post is parsed into a table of words. This could use traditional parsing techniques of searching for delimiters such as spaces, periods, tabs, commas, and other punctuation types. The strings between the delimiters are stored in a table. In some descriptions, this is called tokenization. The words in the table are next analyzed to convert the word into its stem by removing parts of speech that are attached to the word, such as plurality. Some descriptions call finding this process lemmatization—figuring out the most basic form or lemma of each word in the sentence. For some models, the word is categorized as a noun, verb, adverb, adjective, etc. This lemmatized table is then compared to the lemmatized tables of other emails or social media posts along with the metadata (size of message, date and time of posting, intended audience, number of forwards, number of replies, etc.) for the email/social media posts.

This data is sent to an emotion analysis module 303 to determine the emotionality of the message. Using a multilingual classifier based on a machine learning method with data extracted from Twitter each e-mail in our archive was assigned with a sentiment value ranging from 0 to 1, where 0 denotes a negative sentiment, 1 a very positive sentiment, and values around 0.5 a neutral one. Because sentiment is calculated as the average of the whole text, information can get lost. In order to capture the "pathos" transmitted by a message, we used another metric of sentiment analysis called "emotionality". Emotionality is measured as a standard deviation of sentiment, i.e. the more fluctuations in positivity and negativity a message has, the more emotional it is. A second metric of sentiment analysis that we computed was the complexity of the language. Complexity denotes the deviation of word usage with the assumption that the more we deviate from common, general language, the more complex is our language. Complexity is calculated as the likelihood distribution of words within a message, i.e. the probability of each word of a dictionary to appear in the text e using an algorithm based on the well-known term frequency/inverse document frequency information retrieval metric. A message that uses more comparatively rare words has a higher complexity. Numerous studies support the idea that positive affectivity is associated with reduced intention to turnover, and that negative affectivity is associated with increased intention to turnover and actual turnover (Barsade & Gibson, 2007; Pelled & Xin, 1999; Thoresen, Kaplan, & Barsky, 2003). For more information, see Bronnimann, L. (2014), "Multilanguage sentiment analysis of Twitter data on the example of Swiss politicians", University of Applied Sciences Northwestern Switzerland, M.Sc. Thesis.

Then the individual categorization module 203 classifies individuals as "bee", "ant", or "leech". In some embodiments, this is a table lookup using the emotionality value and the complexity value to determine the categorization of the individual email or social media post. These categorizations could be averaged to determine the classification of each individual. In other embodiments, this correlation is performed using a machine-learning model.

Next, the social network analysis module 204 computes metrics like centrality and response time from the email, chat, and social media header data. Centrality is calculated by mapping the relationships between individuals based on the header information (sender, recipient, timestamp) of email, chat, and social media. Response time is calculated by subtracting the email or social media post date and time from a previous email or social media post on the subject.

Then the correlation analysis module 205 relates behavioral types and network metrics to performance data. This correlation could be a lookup using behavior type and network metrics to lookup performance based on a predetermined table. In other embodiments, a machine learning algorithm is used to determine performance based on a model.

Next, the predictive model generation module 206 creates a machine learning model based on the correlations found between individual categorizations, social network metrics, and business performance and presents the computed business performance prediction based on current data to the user.

Figure 3:
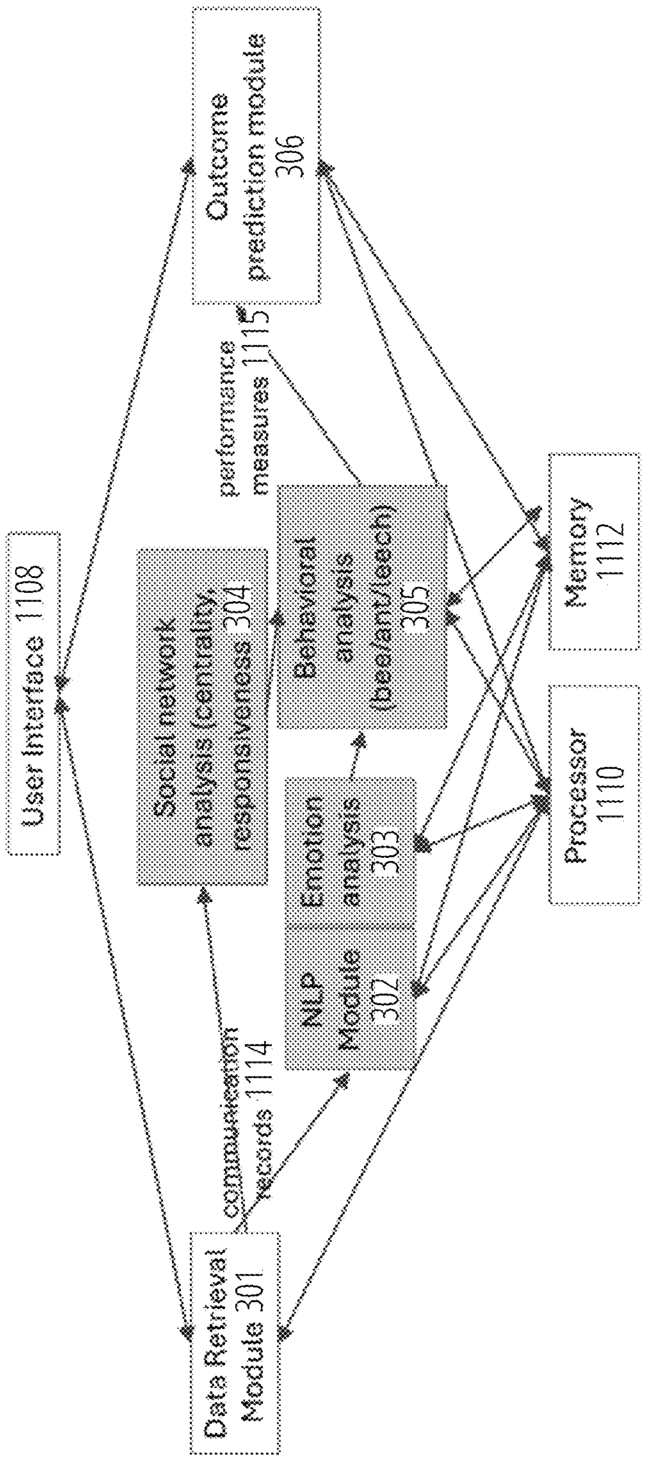
FIG. 3 shows the system architecture of the inventions.
Figure 4:
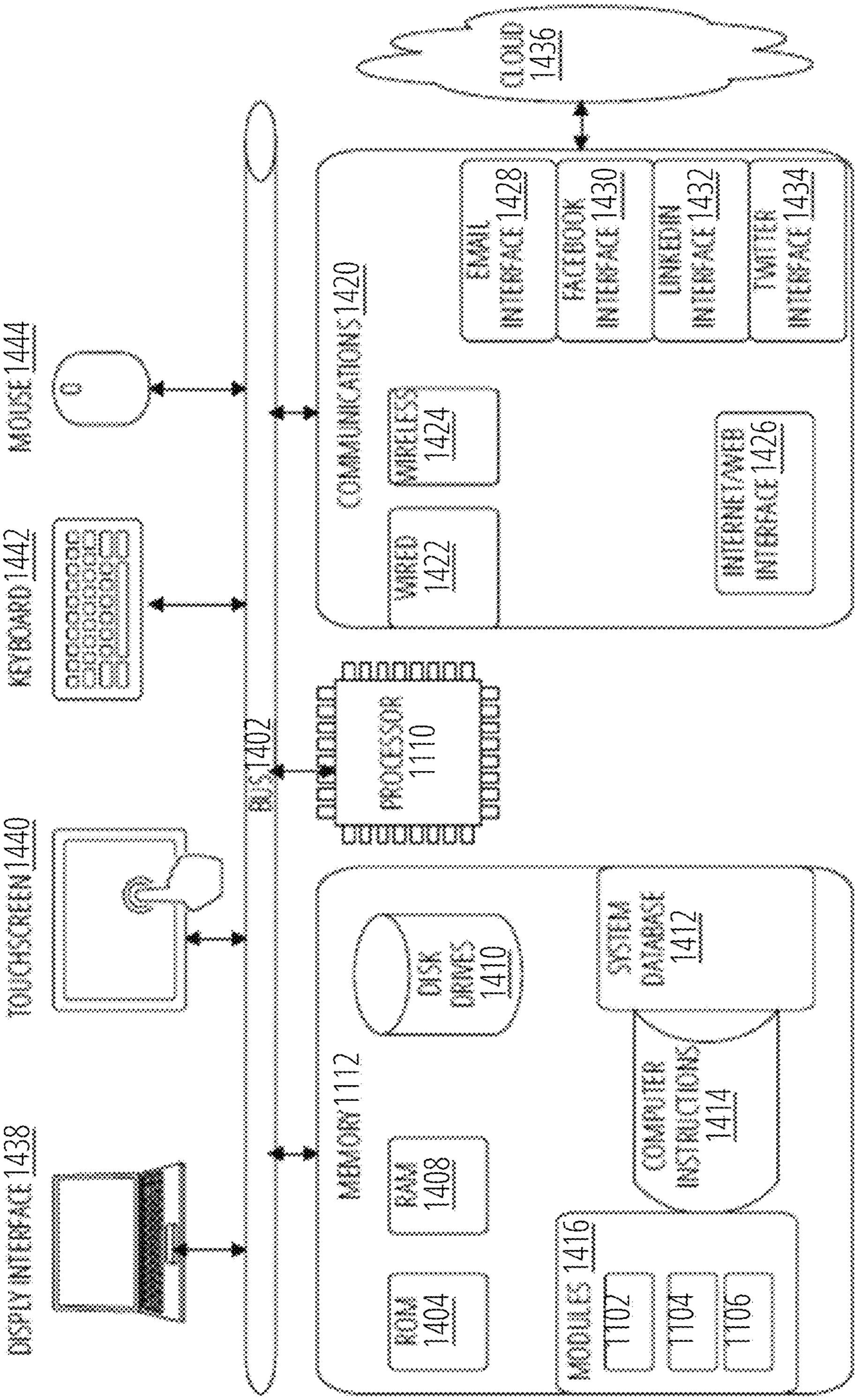
FIG. 4 illustrates a block diagram of a possible hardware implementation.

FIG. 3 illustrates the overall computer system architecture for implementing the morals calculation system. The system could operate as a computer-implemented method, as a non-transitory computer-readable medium storing instructions that, when executed by a processor, cause the processor to perform a method, an apparatus as shown in FIG. 4, as hardware functions implemented in circuitry or on an ASIC, as a set of functions distributed across a network, or an equivalent. The system comprises the following parts:

1) The data retrieval module 301 interfaces with email servers and social media APIs and stores raw communication data from email, chat, and social media.
2) The Natural Language Processing (NLP) NLP module 302 processes raw text data and extracts linguistic features and patterns and calls the emotion analysis module 303 to compute the emotionality of text used in the communication.
3) The social network analysis module 304 computes network metrics (centrality, response time, etc.) by mapping the relationships between individuals based on the header information (sender, recipient, timestamp) of email, chat, and social media.
4) The behavioral analysis module 305 is at the core of the system, computing the personality characteristics "bee"-ness, "ant"-ness, and "leech"-ness of individuals based on the words and emotionalities they use, applying pretrained models that compute a "bee"-ness, "ant"-ness, and "leech"-ness score for each individual.
5) The outcome prediction module 306 interfaces with organizational performance databases, loading standardized performance metrics. It analyzes the relationships between behavioral data and performance and generates predictive models predicting business performance.
6) A processor 1110: A central processing unit that executes the computations required by the Data retrieval module 301, behavioral analysis module 305, outcome prediction module 306, and other modules.
7) Memory 1112: Both volatile (RAM) and non-volatile (e.g., SSD) storage for holding data and program instructions, including instructions for the Data retrieval module 301, behavioral analysis module 305, and outcome prediction module 306. Memory 1112 also holds the system's database.
8) User interface 1108: A graphical interface for displaying results and allowing user interaction with the system. The user interface 1108 may show the results from the outcome prediction module 306 and may collect parameters for the Data retrieval module 301.

The modules interact as follows: The Data retrieval module 301 periodically collects new communication data and stores it in the system's database. The behavioral analysis module 1104 processes this communication data 1114 to calculate up-to-date behavioral metrics, called performance measures 1115. The outcome prediction module 306 then uses these metrics, along with other relevant data, to generate predictions or insights. Results are presented to users through the graphical User interface 1108.

FIG. 4 is a possible hardware configuration. In this configuration of the computerized electronic device, a bus 1402 provides the exchange of data between various components. A processor 1110 may coordinate activity on the bus, retrieving computer instructions 1414 and data from the other devices. The processor could be a microprocessor, a system-on-a-chip, an ASIC, an optical processor, or a similar device. The processor 1110 could receive instructions and data from a touchscreen 1440, a keyboard 1442, a mouse 1444, a display interface 1438, a smartwatch, a camera, a smartphone, a tablet, a telephone, an Internet/Web Interface 1426, or from a wired 1422 or wireless 1424 network (possibly from the cloud 1436).

The hardware configuration may include a communications 1420 subsystem that provides a wired 1422 and wireless 1424 access to external devices through direct connection, local area networks, wide area networks, and the Internet or the cloud 1436. Within the communications 1420 subsystem could be interfaces to the Internet/Web Interface 1426 (such as support for web browsers and web servers), an Email interface 1428 (such as ports for receiving and sending email, and an access mechanism for retrieving email databases for analysis), a Facebook interface 1430 (providing access to a database of Facebook posts and chats), a LinkedIn interface 1432 (that is able to retrieve the LinkedIn database of connections, chats, and posts), a Twitter interface 1434 (with the ability to retrieve tweets and chats from X/Twitter), interfaces to a calendar, a list of meetings, instant messages, texts, phone calls, video calls, as well as access to other social media databases. In some embodiments, some or all of this functionality may be moved to the processor 1110 and memory 1112 or remotely to a server accessible through the wired 1422 or wireless 1424 network interfaces.

The memory 1112 could be made up of ROM 1404, RAM 1408, disk drives 1410, optical storage, and similar storage devices. The memory 1112 could be local to the processor over the bus 1402 or remote or any combination thereof. The memory 1112 could include a system database 1412 of the communication data 1114 retrieved by the data retrieval module 1102. The memory 1112 could also include modules 1416 such as the data retrieval module 1102, the behavioral analysis module 1104, the outcome prediction module 1106, and other modules.

While specific embodiments have been shown and described, many variations are possible. With time, additional features may be employed. The particular shape or configuration of the platform or the interior configuration may be changed to suit the system or equipment with which it is used.

Having described the inventions in detail, those skilled in the art will appreciate that modifications may be made to the inventions without departing from their spirit. Therefore, it is not intended that the scope of the inventions be limited to the specific embodiments illustrated and described. Rather, it is intended that the scope of these inventions be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

I claim:

1. A computerized electronic device comprising:

a processor;

memory, communicatively connected to the processor; and a communications subsystem, communicatively connected to the processor and the memory;

the memory comprising:

an electronic communications database;

a data retrieval module, the data retrieval module including non-transitory computer instructions for the processor to periodically collect, via a first API to email servers and a second API to social media servers, electronic communications data related to an organization from at least 871 emails and social media posts through the communications subsystem and store raw communications data from the at least 871 emails and social media posts in the electronic communications database;

a data analysis module, configured to access the raw communications data in the electronic communications database, the data analysis module including non-transitory computer instructions for the processor to apply a natural language processing algorithm to extract word embeddings and social network metrics from the at least 871 emails and social media posts;

an individual categorization module, configured to access the word embeddings and the social network metrics, the individual categorization module including non-transitory computer instructions for the processor to classify the at least 871 emails and social media posts into behavioral types based on the word embeddings and the social network metrics using long short-term memory machine learning to model the behavioral types with accuracy validated using Cohen's Kappa;

a correlation analysis module, configured to access the behavioral types, the correlation analysis module including non-transitory computer instructions for the processor to correlate the behavioral types and the social media posts with performance metrics of the organization to form a regression analysis table, wherein the performance metrics include a rating of group performance; and an outcome prediction module, configured to access the regression analysis table, the outcome prediction module including non-transitory computer instructions for the processor to generate a performance model of organization's performance based on the regression analysis table, and present a prediction of the organization's performance based on the regression analysis table.

2. The computerized electronic device of claim 1 wherein the memory further comprises a social network analysis module, configured to access the behavioral types and the social network metrics, the social network analysis module including non-transitory computer instructions for the processor to compute centrality and response time metrics from the behavioral types and the social network metrics.

3. The computerized electronic device of claim 2 wherein the correlation analysis module is further configured to access the centrality and response time metrics and incorporates the centrality and response time metrics in forming of the regression analysis table.

4. The computerized electronic device of claim 1 wherein the memory further comprises an emotional analysis module configured to access the word embeddings and the social network metrics to determine levels of specific emotions in the at least 871 emails and social media posts.

5. The computerized electronic device of claim 4 where the individual categorization module is configured to access the specific emotions and incorporate the specific emotions into a determination of the behavioral types.

6. The computerized electronic device of claim 4 where the specific emotions include the levels of anger, fear, happiness, and sadness.

7. The computerized electronic device of claim 1 where the individual categorization module employs a machine learning algorithm trained on a dataset of known behavioral examples.

8. The computerized electronic device of claim 1 where the communications subsystem includes a Facebook interface.

9. The computerized electronic device of claim 1 where the communications subsystem includes a LinkedIn interface.

10. The computerized electronic device of claim 1 where the behavioral types comprise "bee", "ant", and "leech".

11. The computerized electronic device of claim 1 where the behavioral types are assigned a first behavior type when the word embeddings and the social network metrics substantially indicate ethical behavior, high interest in collaborative tasks, openness to new experiences, and a tendency to assist others.

12. The computerized electronic device of claim 1 where the behavioral types are assigned a second behavior type when the word embeddings and the social network metrics substantially indicate unethical behavior, self-promoting and self-absorbed behavior, and a tendency to prioritize personal gain over group welfare.

13. A computer-implemented method comprising:

retrieving data by a processor with a data retrieval module, the data retrieval module periodically collecting, via a first API to email servers and a second API to social media servers, electronic communications data related to an organization from at least 871 emails and social media posts through a communications subsystem communicatively connected to the processor and storing raw communications data from the at least 871 emails and social media posts in an electronic communications database in a memory communicatively connected to the processor;

applying a natural language processing algorithm on the processor to extract word embeddings and social network metrics from the raw communications data from the at least 871 emails and social media posts with a data analysis module;

classifying, with the processor, the at least 871 emails and social media posts into behavioral types based on the word embeddings and the social network metrics with an individual categorization module, using long short-term memory machine learning to model the behavioral types with accuracy validated using Cohen's Kappa;

correlating, with the processor, the behavioral types and the social media posts with performance metrics of the organization to form a regression analysis table using a correlation analysis module, wherein the performance metrics include a rating of group performance; and generating a performance model of organization's performance based on the regression analysis table, and presenting a prediction of the organization's performance based on the regression analysis table with an outcome prediction module.

14. The computer-implemented method of claim 13, further comprising computing centrality and response time metrics from the behavioral types and the social network metrics by a social network analysis module.

15. The computer-implemented method of claim 14, where the correlation analysis module incorporates the centrality and response time metrics in forming of the regression analysis table.

16. The computer-implemented method of claim 13, further comprising accessing the word embeddings and the social network metrics to determine levels of specific emotions in the at least 871 emails and social media posts by an emotional analysis module.

17. The computer-implemented method of claim 16, where the individual categorization module incorporates the specific emotions into determining of the behavioral types.

18. The computer-implemented method of claim 16, where the specific emotions include the levels of anger, fear, happiness, and sadness.

19. The computer-implemented method of claim 18, wherein the individual categorization module employs a machine learning algorithm trained on a dataset of known behavioral examples.

20. The computer-implemented method of claim 13, where the behavioral types are assigned a third behavior type when the word embeddings and the social network metrics substantially indicate firm moral values within a group, competitive and hard work, and valuing tradition and loyalty.

21. The computerized electronic device of claim 1, wherein the performance metrics include customer satisfaction ratings.

22. The computer-implemented method of claim 13, wherein the performance metrics include customer satisfaction ratings.

23. The computerized electronic device of claim 1, wherein the word embeddings include linguistic features.

24. The computer-implemented method of claim 13, wherein the social network metrics include communications patterns.

* * * * *